United States Patent [19]
Still et al.

[11] Patent Number: 6,092,926
[45] Date of Patent: Jul. 25, 2000

[54] THERMAL MONITORING SYSTEM FOR SEMICONDUCTOR DEVICES

[75] Inventors: Stephen Eugene Still, Lake Worth; Ray Garcia, Boca Raton; Kendall Anthony Honeycutt, Boca Raton; James J. Tout, Jr., Boca Raton, all of Fla.

[73] Assignee: International Business Machines Corporation, Armonk, N.Y.

[21] Appl. No.: 09/156,201

[22] Filed: Sep. 17, 1998

[51] Int. Cl.[7] ....................................... G01K 1/00
[52] U.S. Cl. ............................... 374/141; 133/43
[58] Field of Search ............... 374/4, 5, 10, 15, 374/20, 43, 57, 110, 133, 165, 166, 141; 62/3.2, 3.3

[56] References Cited

U.S. PATENT DOCUMENTS

| | | | |
|---|---|---|---|
| 4,475,145 | 10/1984 | Heil et al. | 361/386 |
| 5,206,713 | 4/1993 | McGeary | 257/684 |
| 5,483,102 | 1/1996 | Neal et al. | 257/712 |
| 5,603,570 | 2/1997 | Shimizu | 374/141 |
| 5,679,266 | 10/1997 | Darekar et al. | 216/13 |
| 5,847,929 | 12/1998 | Bernier et al. | 361/719 |
| 5,931,580 | 8/1999 | Wyland | 374/141 |

*Primary Examiner*—G. Bradley Bennett
*Assistant Examiner*—Gail Verbitsky
*Attorney, Agent, or Firm*—Fleit, Kain, Gibbons, Gutman & Bongini P.L.; Jon A. Gibbons

[57] ABSTRACT

A method for monitoring the operating temperature of a semiconductor device. The method comprising the steps of: placing a thermal coupling material between the bottom of the semiconductor device and the top of a printed circuit board for inserting the device thereinto; inserting a sensor so to be at least partially covered by the thermal coupling material; and measuring the temperature from the sensor within a predetermined time interval. In accordance with another aspect of the invention, an apparatus is described to carry out the above process.

16 Claims, 5 Drawing Sheets

THERMAL MONITORING SYSTEM FOR SEMICONDUCTOR DEVICES

CROSS-REFERENCE TO RELATED APPLICATIONS

Not applicable

BACKGROUND OF THE INVENTION

1. Field of the Invention

This invention relates generally to the field of thermal monitoring and more particularly to the field of measuring temperatures during semiconductor operations.

2. Description of the Related Art

As semiconductor integration continues to make advances, the packaging densities of semiconductor devices continues to increase. The number of transistors on semiconductor devices has doubled every couple of years. This continued integration of more electronic circuitry into semiconductor devices is not without undesirable consequences.

One of these undesirable consequences or side-effects is the increase in heat generated due to the increase in packaging density. Several solutions have been employed for removing heat from semiconductor devices. These solutions include heat sinks, cooling fans, and in some cases, liquid cooling. Today many commercially available semiconductor devices, especially microprocessors, such as those used in personal computers from Intel, AMD, IBM, Cyrix and others, ship with attached cooling fans. Typically these cooling fans are fastened as part of a heat sink onto the top side of the semiconductor device. Although these work well in many applications, the operating temperature of the semiconductor device is not monitored and therefore not known during the operation of the semiconductor device.

To overcome this problem, providers of semiconductor devices have been integrating temperature sensors directly into the cavity of the socket for plugging in the semiconductor device. A socket refers to a receptacle, usually soldered to a printed circuit board, for plugging in the semiconductor device. The use of temperature sensors, such as thermal-couples and thermistors, enables the monitoring of a semiconductor device during operation and notifies the operator if the temperature is out of a desired operating range. This is particularly important in applications where predicting that a semiconductor device may start operating out of range is important. For instance, the use of a semiconductor device in a machine for an industrial manufacturing application or for use in a mission critical application such as a PC server for a business.

The use of a temperature sensor, although it enables monitoring, out-of-temperature alarming and semiconductor device failure prediction, is not without its shortcomings. One shortcoming when using a temperature sensor embedded in the cavity of a socket for plugging a semiconductor device is accounting for the difference in the temperature between the semiconductor device and the temperature measured by the sensor itself. Several semiconductor manufacturers rate the temperature operating range of semiconductor devices as the temperature measure at the top center of the semiconductor device. Measuring the operating temperature of a semiconductor device is difficult in applications where the top of the device is covered by a heat sink, a fan, or both. Therefore a need exists to relate the temperature directly provided by manufacturers for the top of a semiconductor device with the temperature specified by a sensor embedded in the cavity of the socket underneath the semiconductor device.

Still, another shortcoming of using a temperature sensor embedded in a socket is the need to adapt the monitoring of temperature ranges for pin compatible semiconductor devices. Pin compatible semiconductors have different operating temperature ranges. It is not uncommon for one manufacturer of a pin compatible semiconductor to have a temperature range that is different from another manufacturer of the same pin compatible device. In addition, pin compatible semiconductor devices, such as microprocessors, are available in several clock speeds. One example is an Intel Pentium II running at 233 MHZ and a Pentium II Chip running at 400 MHZ. The temperatures for these pin compatible semiconductor devices may be different. Accordingly a need exists to provide a method and apparatus to monitor the operating temperature of a pin compatible semiconductor devices that can accommodate different temperature characteristics.

Yet, another shortcoming for the manufacturers of a pin compatible semiconductor devices, is the presumption of consistencies in the packaging of semiconductors. For example, the bottom surface the semiconductor device may have indentations, and other irregularities that do not provide a direct contact to the sensor. Heat from the device is transferred by conduction through the trapped air spaces between the top of the device socket and the bottom of a semiconductor device. Experiments have shown that a major source of heat transfer from a semiconductor device is through the metallic pins mounted to the semiconductor device. Heat is conducted through the metallic pins of the semiconductor device, through the metallic receptacles of the socket and through to the circuit board. This heat transfer path circumvents heat transfer directly to the sensor. Instead, heat is transferred from the device back up through the socket through the circuit board to the sensor. Accordingly, a need exists to provide a method and apparatus to measure the temperature of semiconductor devices to overcome these problems

SUMMARY OF THE INVENTION

Briefly, in accordance with the present invention, a method for monitoring the operating temperature of a semiconductor device, comprises the steps of: placing a thermal coupling material between the bottom of the semiconductor device and the top of a printed circuit board for inserting the device thereinto; inserting a sensor so to be at least partially covered by the thermal coupling material; and measuring the temperature from the sensor within a predetermined time interval. In accordance with another aspect of the invention, an apparatus is described to carry out the above process.

DETAILED DESCRIPTION OF AN EMBODIMENT

Figure 1:
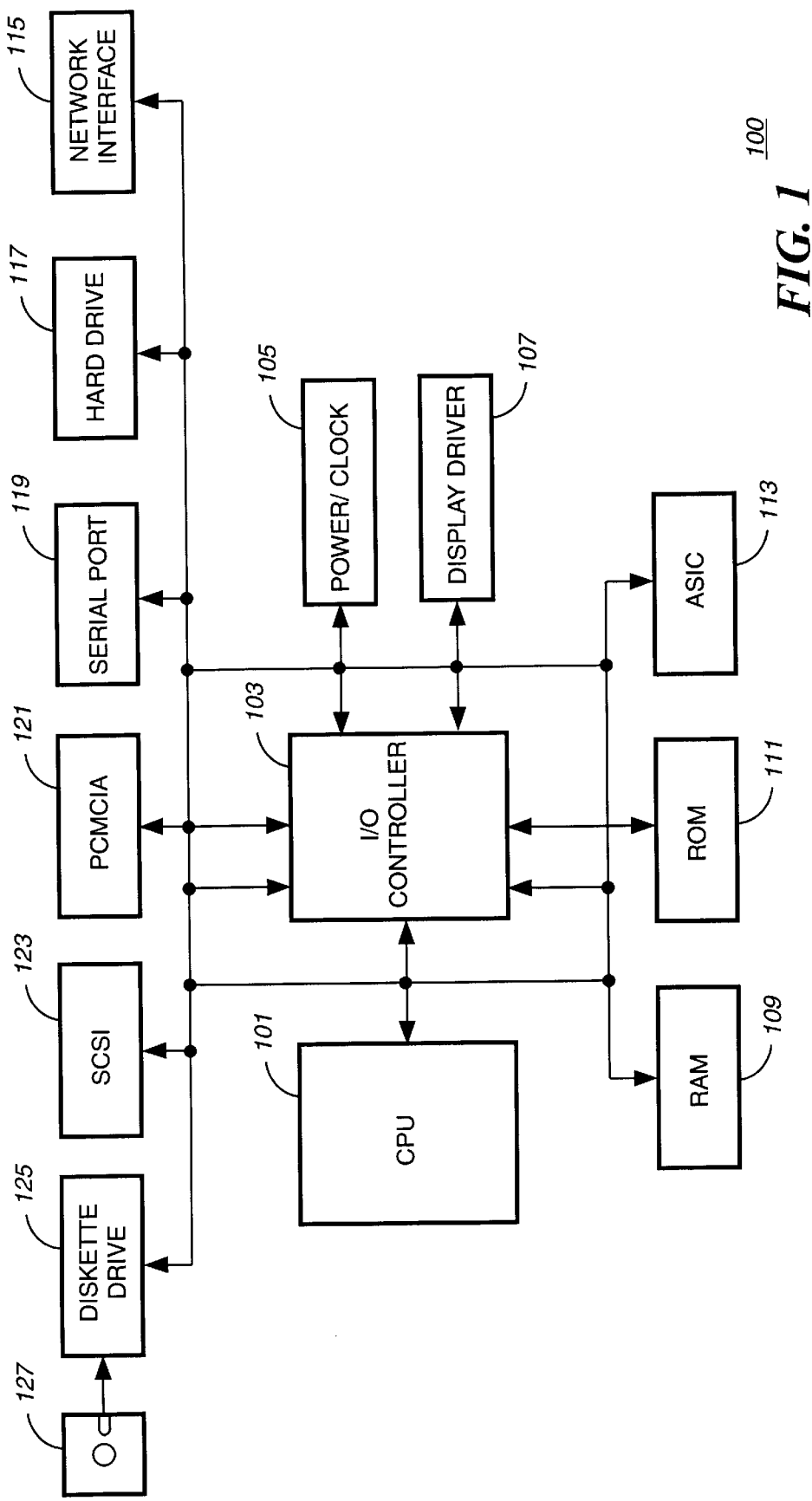
FIG. 1 Is a block diagram of the major electrical components of a information processing according to the present invention.

Referring to FIG. 1, there is shown a block diagram of the major electrical components of an information processing device 100 in accordance with this invention. The electrical components include: a central processing unit (CPU) 101, an Input/Output (I/O) Controller 103, a system power and clock source 105; display driver 107; RAM 109; ROM 111; ASIC (application specific integrated circuit) 113 and a hard disk drive 117. These are representative components of a computer. The operation of a computer comprising these elements is well understood. Network interface 115 provides connection to a computer network such as Ethernet, TCP/IP or other popular protocol network interfaces. Optional components for interfacing to external peripherals include: a Small Computer Systems Interface (SCSI) port 123 for attaching peripherals; a PCMCIA slot 121; and serial port 119. An optional diskette drive 125 is shown for loading or saving code to removable diskettes 127. The system 100 may be implemented by combination of hardware and software. Moreover, the functionality required for using the invention may be embodied in computer-readable media (such as 3.5 inch diskette 127) to be used in programming an information-processing apparatus (e.g., a personal computer) to perform in accordance with the invention.

Figure 2:
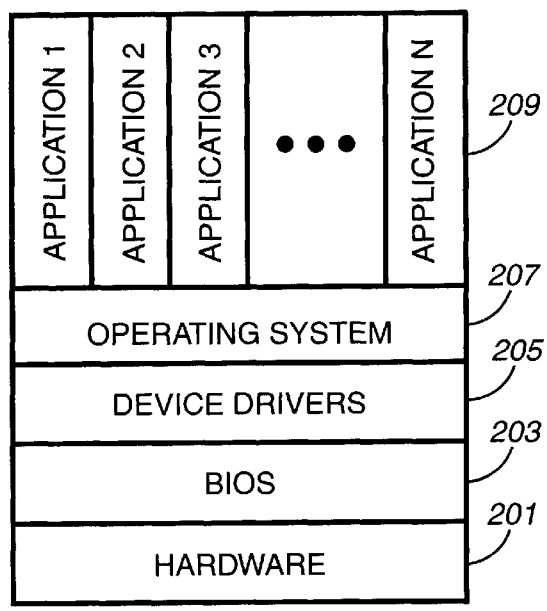
FIG. 2 is a block diagram illustrating the software hierarchy for the information processing device of FIG. 1 according to the present invention.

FIG. 2 is a block diagram illustrating the software hierarchy of for the information processing device of FIG. 1 according to the present invention. The hardware 201 is the information processing device of FIG. 1. BIOS (Basic Input Output System) 203 is a set of low level of computer hardware instructions, usually stored in ROM 111, for communications between an operating system 207, device driver(s) 205 and hardware 201. Device drivers 205 are hardware specific code used to communicate between and operating system 207 and hardware peripherals such as a CD ROM drive or printer. Applications 209 are software application written in C/C++, assembler or equivalent. Operating system 207 is the master program that loads after BIOS 203 initializes, that controls and runs the hardware 201. Examples of operating systems include DOS, Windows 3.1/95/98/NT, Unix, Macintosh, OS/2 and equivalent.

Figure 3:
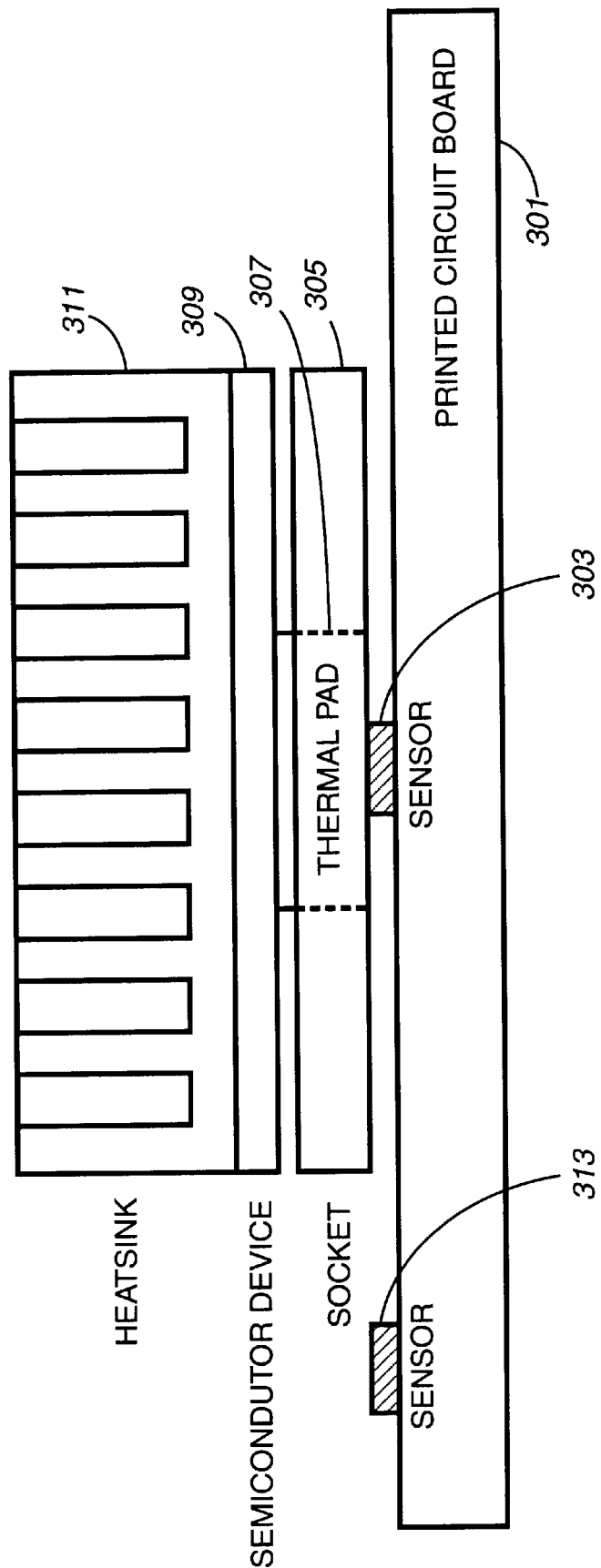
FIG. 3 is a cross-sectional view of the thermal monitoring system according to the present invention.

FIG. 3 there is a cross-sectional view of the thermal monitoring system according to the present invention. A printed circuit board 301 is shown. The printed circuit board 301 is a multilevel fiberglass and copper computer board found in most popular PCS (Personal Computers) and other informational processing devices. Mounted to the printed circuit board 301 is a semiconductor socket 305 for plugging in a semiconductor device 309 such as a central processor unit from Intel, IBM or equivalent or any device mounted to a socket 305. A heatsink 311 is mounted on top of semiconductor device 309. An optional cooling fan (not shown) may be attached to heatsink 311. The socket 305 has a hollow cavity in the center.

Figure 5:
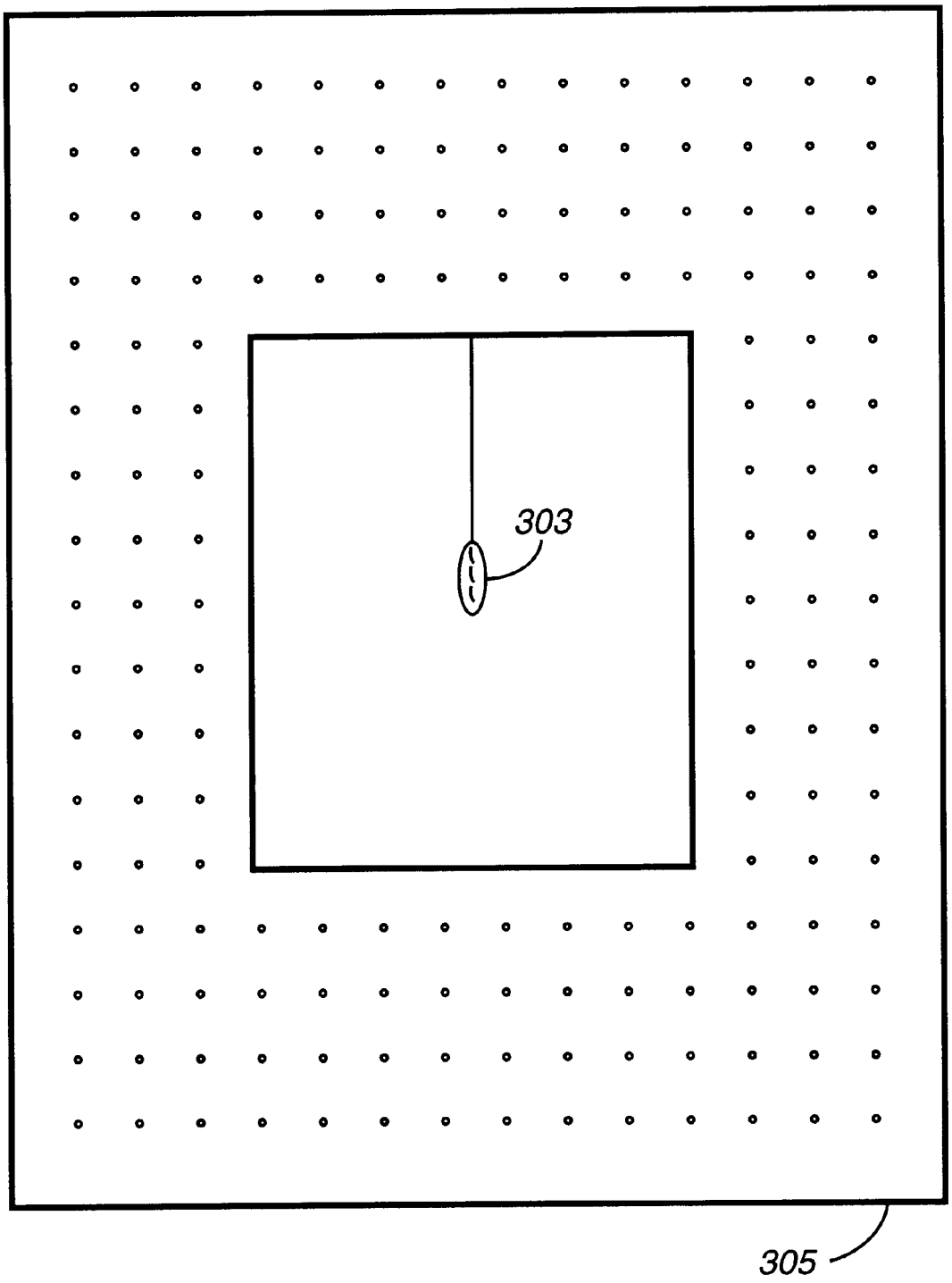
FIG. 5 depicts a top view of a socket with a hollow cavity according to the present invention.

FIG. 5 depicts a top view of a socket with a hollow cavity. An example socket 305 is an Intel Pentium compatible processor socket from AMP, Berg, or other suppliers. A sensor 303 is located in the hollow cavity of socket 305. The sensor 303 such a thermistor or thermal-couple is soldered to the printed circuit board 301 in the center of the hollow cavity of socket 305. In the preferred embodiment, the sensor is a solid state digital temperature sensor such as a LM75 from National Semiconductor.

A thermal pad 307, such as zinc filled silicone rubber occupies the space in between the top of sensor 303 and the bottom of semiconductor device 309. This thermal pad 307 is pliable enough to be compressible and occupy substantially all the vertical distance between the top of socket 305 and bottom of semiconductor device 309. Sandwiched between the semiconductor device 309 and the sensor 303, the thermal pad 307 enables thermal conduction directly through it. The thermal pad 307 must be tall enough to fit a variety of plug compatible semiconductor devices that plug into the socket 305. The length and width of the thermal pad 307 must be smaller than the pin grid array area on the semiconductor device 309.

Figure 4:
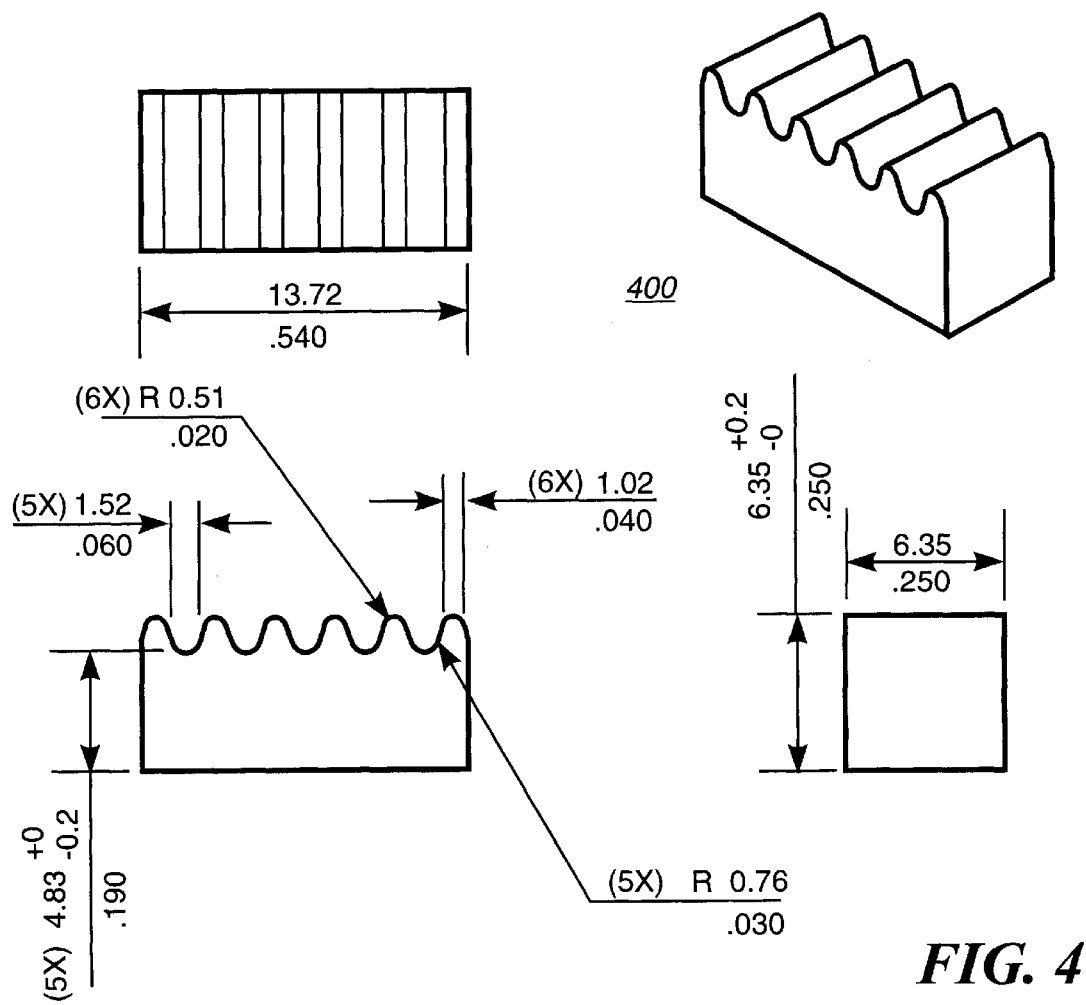
FIG. 4 shows multiple views (an elevational view, a top view, side view and end view) of the thermal pad according to the present invention.

Referring now to FIG. 4, there are shown multiple views 400 of the thermal pad 307. In the preferred embodiment, the thermal pad 307 is constructed from a custom extruded zinc filled silicone rubber, but any pliable material with low heat capacity and good thermal conduction characteristics will work. The thermal pad 307 is preferably 0.540" in length as show in the top view of FIG. 4. The thermal pad 307 is 0.250" wide by 0.250" high as illustrated in the end view in FIG. 4. The dimensions of the thermal pad 307 are preferred. Nevertheless, other dimensions and shapes of thermal pad 307 may by used depending on the type of semiconductor device 309 and whether or not the semiconductor device is mounted in a socket 309 or attached directly to the printed circuit board 301. And if a socket 305 is used, the dimensions of the thermal pad 307 will vary depending the type and size of the socket 305.

All the surfaces of the thermal pad 307 are substantially flat, except the top side which is sinusoidal in shape as illustrated in side view of FIG. 4. The sinusoidal shape enables the thermal pad 307 to be compliant when compressed in the area defined by the cavity of the socket 305 and the bottom side of the semiconductor device 309. However, it should be understood that the volume defined between the bottom surface of the semiconductor device 309 and the top side of the socket 305 can vary. There are three primary sources for this variation. First, as with any mass produced part, there are finite tolerances maintained in a manufacturing process. Here there are variances in the production of both the semiconductor device 309 and the socket 305. Second, there are variations in the families of pin compatible semiconductor devices produced by the same manufacturers. And third, there are often variations from one manufacturer of a semiconductor device to another manufacturer of a pin compatible semiconductor device. All three of these sources of variations create a volume that can change. The thermal pad 307 must fill this volume. To achieve this, the sinusoidal shape of the top of the thermal pad 307 provides a snug fit to transfer heat from the bottom of the semiconductor device 309 to the top of sensor 303. By being pliable, this sinusoidal shape can adapt to the variations in height.

Figure 6:
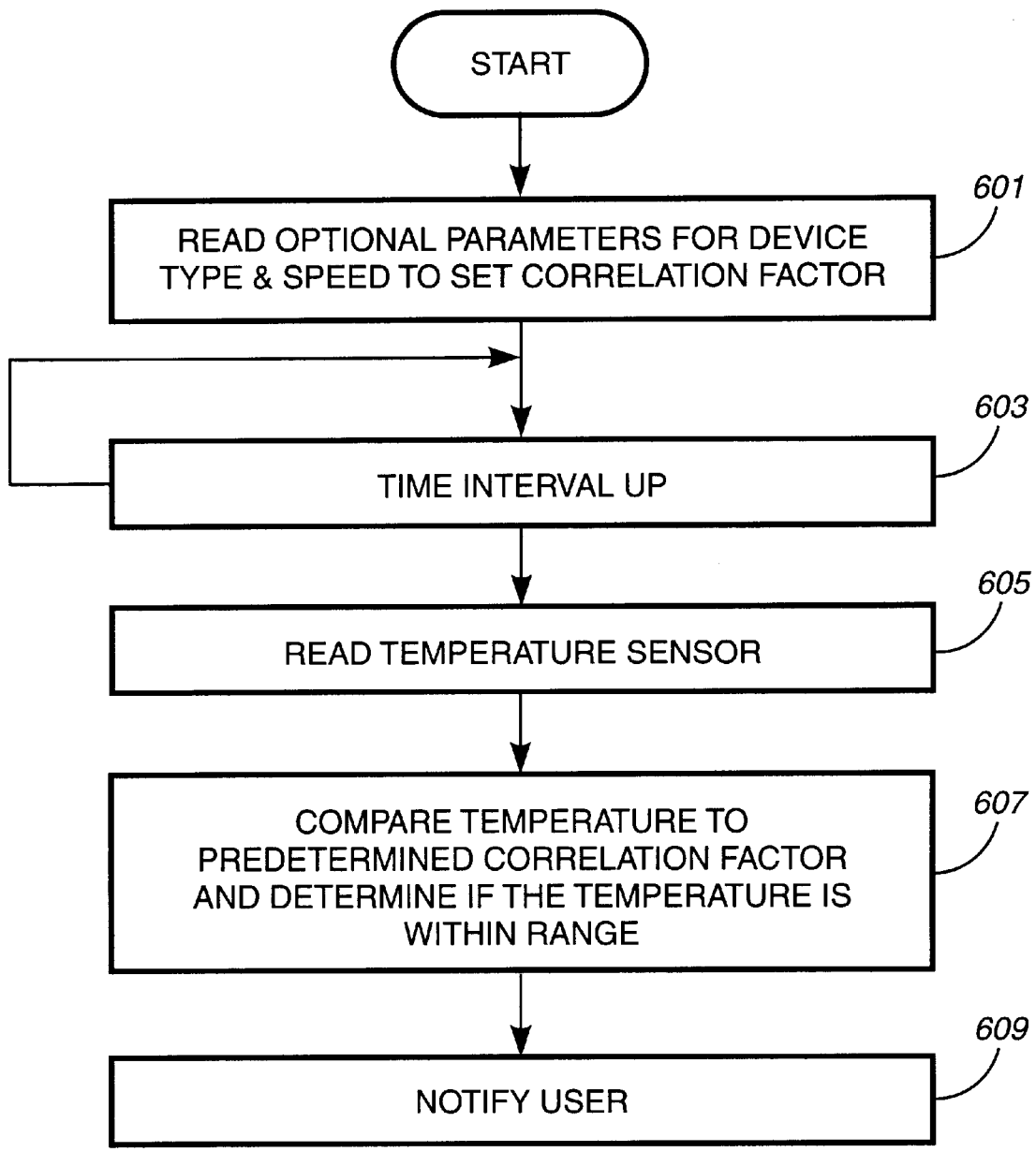
FIG. 6 is a flow diagram for a monitoring application for a semiconductor device according to the present invention.

FIG. 6, there is shown a flow diagram of an application for monitoring a semiconductor device according to the present invention. The flow can be implemented in the BIOS 203 or as the Application 209 or a combination of both or suitable storage or memory devices. In another embodiment, the firmware (not shown) mounted to the printed circuit board implements this monitoring application. The process begins with reading optional parameters for the device type, to be monitored, step 601. These command line parameters can be read from an initialization or .INI file or passed as command line arguments. Example command line parameters include the device operating speed, device type and device manufacturer. Next, a timer is set for a predetermined time. The timer can have a resolution to a few seconds and armed with a time value of a minute or greater. Many Operating Systems 207 support timer functions that can send a software interrupt back to an Application 209. The use of the ctime() function combined with the signals function in C/C++ is one example. Once the timer interval is expired, step 603, the process proceeds with reading the temperature of the sensor 303. The sensor is usually wired to an I/O (input/Output) port controlled by the CPU 101. The reading of an external sensor connected to an I/O point is known. Next, the temperature read in step 605 is compared with a predetermined correlation factor, step 607. The correlation factor is a factor determined by experimentally measuring the difference in temperature between the top center of a semiconductor device 309 and the measured temperature from sensor 303. The table below is the correlation data for several processors. All the columns represent temperature differences between the temperature sensor 303 and a temperature sensor located as specified by the column. The temperature is represented in degrees Celsius.

| CPU | FAN ON TP-TPS | FAN ON TPS-TAS | FAN OFF TP-TPS | FAN OFF TPS-TAS |
|---|---|---|---|---|
| K6-2 300 Mhz | 1 | 8.5 | 12 | 25 |
| K6 266 Mhz | 2.5 | 9 | 3 | 23 |
| Intel MMX 233 Mhz | 4 | 8 | 16 | 27.5 |
| Intel 200 MHZ | 6 | 10 | 18.5 | 28 |
| Intel 166 MHZ | 3.5 | 7 | 9.5 | 21.5 |
| Intel Plastic 166 MHZ | 2.5 | 7 | 11.5 | 21.5 |
| Intel Ceramic 133 MHZ | 1.5 | 5.5 | 6.5 | 18.5 |
| Intel Ceramic 100 MHZ | 4 | 5.5 | 9.5 | 18 |

The first column is the difference in temperature measured at the top center of the processor (TP) with a fan and the temperature measure at the sensor 303 (TPS). The second column is the difference in temperature measured at the sensor 303 (TPS) with the fan running and the temperature measured at the ambient sensor 313 (TAS). The third column is the difference in temperatures measured at the top of the processor (TP) without a fan and the temperature measures at the sensor 303 (TPS). The fourth column is difference in the temperature measured at the sensor 303 (TPS) without a fan and the temperature measured at the ambient sensor 313 (TAS). The temperature measure at the top center of the processor (TP) is usually the location specified by the device manufacturer. Other locations may be specified for other semiconductor devices.

With the measured data above, several generalizations are possible to create a correlation factor. To begin a correlation factor for each processor speed can be entered. The correlation factor can also accommodate for other differences such as the semiconductor device packaging (e.g. ceramic or plastic) and the operating speed of the semiconductor device. The use of a correlation factor along with the thermal pad 307, enables the accurate measurement of the operating temperature of the semiconductor device 309. In addition, extrapolation techniques in Application 209 can be used to predict the operating temperature of a semiconductor device 309 drifting toward an undesirable range. Finally, in step 609, the end-user is notified of the out of temperature condition via an audible alarm or a system message displayed on the screen of the information processing system or any automated action under program control such as turning on an air conditioner to cool down the ambient temperature.

In an alternate embodiment, the correlation factor can use a second temperature sensor 313 that measures ambient temperature (TAS). The ambient temperature sensor 313 can be mounted near the CPU on the printed circuit board 301. Under normal conditions, if TPS is more than 14 degrees Celsius hotter than TAS, one of the following conditions has occurred: (1) a fan failure; (2) fan is not plugged in or (3) a heatsink is not installed. If the TPS is less than 14 degrees Celsius as measured between TPS and TAS, that is the difference in temperature between TPS and TAS, and if TPS is less than 64 degrees Celsius, the processor is operating within the acceptable temperature range. Using the table above, more accurate numbers can be derived for a given processor speed and processor package.

In another embodiment, TPA can be monitored to ensure the ambient air flow is within the specifications for the printed circuit board 301. The ambient temperature flow can be especially important in applications where the information processing device 100 is mounted in an enclosure such as a case or place in a closed environment such as a closet. In these applications, ambient temperature may be specified for other devices such as hard disk drive for a given range. This may be important for devices such as hard disk drives that require certain operating ranges. It is common for the air within the box to be 2 to 3 degrees hotter at TPA than the true ambient temperature. The use of other correlation factors can be used to notify the users of out of range temperature conditions.

In still another embodiment, the semiconductor device 309 may be mounted directly to the printed circuit board 301 without the use of socket 305. This is common in many applications where the device may be fastened directly to the printed circuit board during assembly such as by soldering. The thermal pad 307 is sandwich in between the bottom of the semiconductor device 309 and the top of the printed circuit board 301. The sensor 303 is fastened to the printed circuit board 301 using suitable adhesive or just held in place underneath the thermal pad 307 by the downward pressure from the thermal pad 307.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method to monitor the temperature of a device comprising the steps of:

placing a thermal coupling material between the bottom of the device and the top of a circuit board for inserting the device thereinto;

placing a first sensor into a location such that at least thermal contact with thermal coupling material is made;

measuring the temperature from the sensor within a predetermined time interval;

comparing the temperature measured with the sensor to a first correlation factor for the device;

identifying the operating speed of the devices; and comparing the temperature measured for this speed with the first correlation factor.

2. The method of claim 1, wherein the step of comparing the temperature includes identifying the packaging configuration of the device and comparing the temperature measured for this configuration with the first correlation factor.

3. The method of claim 1, wherein the step of comparing the temperature includes notifying an application program whether the temperature measured by the first sensor is outside of a predetermined temperature range.

4. The method of claim 1, further comprising the steps of:
mounting a second sensor in the vicinity of the device;
measuring the ambient air temperature surrounding the device; and
comparing the temperature measured with the second sensor with the temperature measured with the first sensor.

5. The method of claim 4, further comprising the step of:
comparing the temperature measured with the second sensor with a correlation factor for the device.

6. The method of claim 5, further comprising the step of:
notifying the application program whether the temperature measured with the second sensor is outside a predetermined range.

7. The method of claim 5, further comprising the steps of:
comparing the difference in temperature as measured by the first sensor and the temperature measured by the second sensor to a second correlation factor for the device.

8. The method of claim 7, further comprising the step of:
notifying the application if the difference in temperature is outside a predetermined range.

9. A system to monitor the temperature of a device comprising:
a circuit board for receiving a device;
a thermal coupling material sandwiched between the bottom of the device and the top of the circuit board for inserting the device thereinto;
a first sensor, whereby the first sensor is at least partially in thermal contact with the thermal coupling material;
means for measuring a temperature indication from the first sensor within a time interval;
a comparator for comparing the temperature measured with the first sensor to a first correlation factor for the device;
means for identifying the operating speed of the device; and
means for comparing the temperature measured for this operating speed with the first correlation factor.

10. The system of claim 9, wherein the comparator includes identifying the packaging configuration of the device and a means for comparing the temperature measured for this packaging configuration with the first correlation factor.

11. The system of claim 9, wherein the comparator includes a means for notifying an application program whether the temperature measured by the first sensor is outside of a predetermined temperature range.

12. The system of claim 9, further comprising:
a second sensor mounted in the vicinity of the device;
means for measuring the ambient air temperature surrounding the device; and
means for comparing the temperature measured with the second sensor with the temperature measured with the second sensor.

13. The system of claim 12, further comprising:
means for comparing the temperature measured with the second sensor to a second correlation factor for the device.

14. The system of claim 13, further comprising:
means for notifying the application if the temperature measured with the second sensor is outside a predetermined range.

15. The system of claim 13, further comprising:
means for comparing the difference in temperature as measured by the first sensor and the temperature measured by the second sensor to a second correlation factor for the device.

16. The system of claim 15, further comprising:
means for notifying the application if the difference in temperature is outside predetermined range.

* * * * *